(12) United States Patent
Ikuta et al.

(10) Patent No.: US 12,168,471 B2
(45) Date of Patent: Dec. 17, 2024

(54) STEERING DEVICE

(71) Applicant: NSK LTD., Tokyo (JP)

(72) Inventors: Tomohiro Ikuta, Gunma (JP); Yoshiyuki Sato, Maebashi (JP); Suguru Sugishita, Maebashi (JP); Hirotaka Shimizu, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 17/915,901

(22) PCT Filed: Mar. 25, 2021

(86) PCT No.: PCT/JP2021/012716
§ 371 (c)(1),
(2) Date: Sep. 29, 2022

(87) PCT Pub. No.: WO2021/200598
PCT Pub. Date: Oct. 7, 2021

(65) Prior Publication Data
US 2023/0143959 A1 May 11, 2023

(30) Foreign Application Priority Data

Mar. 30, 2020 (JP) ................................. 2020-059477

(51) Int. Cl.
*B62D 1/184* (2006.01)
*B62D 1/185* (2006.01)

(52) U.S. Cl.
CPC ............. *B62D 1/184* (2013.01); *B62D 1/185* (2013.01)

(58) Field of Classification Search
CPC ................................ B62D 1/184; B62D 1/185
See application file for complete search history.

(56) References Cited

U.S. PATENT DOCUMENTS 8,505,407 B2 * 8/2013 Nomura ................. B62D 1/184
280/775
8,746,740 B2  6/2014 Tanaka
(Continued)

FOREIGN PATENT DOCUMENTS

CN        204399264 U    6/2015
JP        2009-149303 A  7/2009
(Continued)

OTHER PUBLICATIONS

International Search Report for PCT/JP2021/012716 dated Jun. 8, 2021.

*Primary Examiner* — Timothy Wilhelm
(74) *Attorney, Agent, or Firm* — Sughrue Mion, PLLC

(57) ABSTRACT

The steering device includes a steering shaft, a steering column, a bracket, and a fastening mechanism. The steering column includes a lower column and an upper column. The upper column includes a clamp, a cylindrical part, a pair of protrusions, and a reinforcement rib that extends across an outer peripheral surface of the clamp and an outer surface of one of the protrusions. The clamp includes a continuous clamp positioned near the cylindrical part and a spaced clamp spaced apart from the cylindrical part. The protrusions include a continuous protrusion that protrudes from the continuous clamp, and a spaced protrusion that protrudes from the spaced clamp. The reinforcement rib linearly extends from the spaced protrusion toward the continuous clamp.

3 Claims, 10 Drawing Sheets

(56) References Cited

U.S. PATENT DOCUMENTS

| | | | | |
|---|---|---|---|---|
| 8,869,646 | B2* | 10/2014 | Tanaka | B60R 25/0211 74/494 |
| 8,904,901 | B2* | 12/2014 | Mashimo | B62D 1/184 280/775 |
| 9,145,161 | B2* | 9/2015 | Nagasawa | B60R 25/021 |
| 9,180,902 | B2* | 11/2015 | Nagasawa | B62D 1/185 |
| 9,248,804 | B2* | 2/2016 | Tanaka | B62D 1/184 |
| 9,254,860 | B2* | 2/2016 | Mihara | B62D 1/185 |
| 9,828,018 | B2* | 11/2017 | Mihara | B62D 1/184 |
| 10,059,363 | B2* | 8/2018 | Sugishita | B62D 1/184 |
| 10,065,671 | B2 | 9/2018 | Sugishita | |
| 10,093,340 | B2* | 10/2018 | Sugishita | B62D 1/185 |
| 11,148,703 | B2* | 10/2021 | Sugishita | B60R 25/021 |
| 11,279,395 | B2* | 3/2022 | Genet | B62D 1/195 |
| 11,427,243 | B2* | 8/2022 | Sugishita | B62D 1/185 |
| 11,498,605 | B2* | 11/2022 | Sugishita | B62D 1/189 |
| 2007/0068311 | A1* | 3/2007 | Shimoda | B62D 1/195 74/493 |
| 2014/0150596 | A1* | 6/2014 | Nagasawa | B22D 19/04 164/112 |
| 2015/0107398 | A1* | 4/2015 | Nagasawa | B22D 19/16 74/493 |
| 2016/0272234 | A1* | 9/2016 | Terasawa | B62D 1/185 |
| 2018/0029628 | A1* | 2/2018 | Sugishita | B62D 1/185 |
| 2023/0132450 | A1* | 5/2023 | Ikuta | B62D 1/184 74/493 |
| 2023/0143956 | A1* | 5/2023 | Ikuta | B62D 1/185 74/493 |

FOREIGN PATENT DOCUMENTS

| | | |
|---|---|---|
| JP | 2013-256193 A | 12/2013 |
| JP | 2017-197178 A | 11/2017 |
| JP | 2018-8595 A | 1/2018 |
| JP | 2018-79821 A | 5/2018 |
| JP | 2018-83613 A | 5/2018 |
| WO | 2014/163112 A1 | 10/2014 |
| WO | 2014/163113 A1 | 10/2014 |
| WO | 2016/186149 A1 | 11/2016 |
| WO | 2017/068804 A1 | 4/2017 |

* cited by examiner

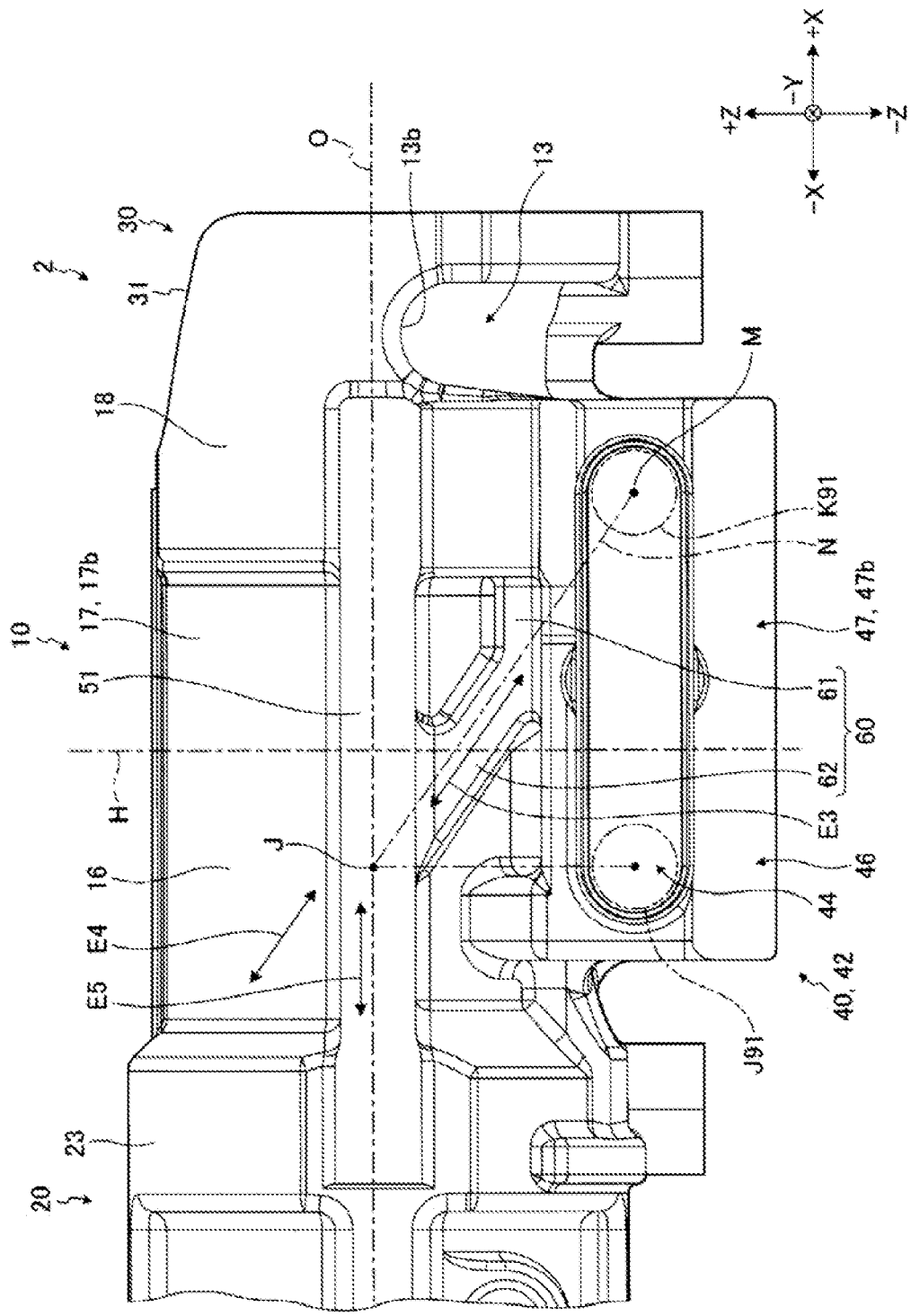

STEERING DEVICE

CROSS REFERENCE TO RELATED APPLICATIONS

This application is a National Stage of International Application No. PCT/JP2021/012716 filed Mar. 25, 2021, claiming priority based on Japanese Patent Application No. 2020-059477 filed Mar. 30, 2020.

FIELD

The present invention relates to a steering device.

BACKGROUND

A steering device disclosed in Patent Literature 1 includes a telescopic steering shaft supported by a cylindrical outer steering column. Accordingly, a position of a steering wheel can be changed in an axial direction of the steering shaft. The steering column also includes a lower column that is fixed to a vehicle body side and an upper column that supports the steering shaft. The upper column is slidably coupled to a lower shaft to be able to correspond to telescopic movement of the steering shaft.

The upper column by the steering device disclosed Patent Literature 1 is also restricted not to slide; thereby, a position of the steering wheel is secured in the axial direction. Specifically, the upper column disclosed in Patent Literature 1 includes a clamp that is externally slidably fitted to the lower column, a cylindrical part to which a bearing supporting the steering shaft is internally fitted, and a pair of protrusions that protrudes radially outward from an outer peripheral surface of the clamp. In addition, the steering device includes a bracket that includes a first side plate and a second side plate so that the clamp is interposed therebetween, and a fastening mechanism that fastens the first side plate and the second side plate. The fastening mechanism has a fastening shaft that penetrates the first side plate and the second side plate, and an operation lever that operates the fastening mechanism. A slit that has a groove width in a direction where the fastening shaft extends is provided in the clamp. The pair of protrusions is spaced apart from each other in the direction where the fastening shaft extends and is penetrated by the fastening shaft. In a case in which a fastening force of the fastening mechanism acts by the operation of the operation lever, the first side plate and the second side plate are brought close to each other along the fastening shaft. Thus, the pair of protrusions is fastened by the first side plate and the second side plate, and the groove width of the slit in the clamp is narrower. In other words, the clamp is deformed such that a diameter thereof is reduced to clamp the lower column disposed therein. As a result, the upper column is restricted not to slide, so that a position of the steering wheel is secured.

CITATION LIST

Patent Literature

Patent Literature 1: Japanese Patent Application Laid-open No. 2013-256193

SUMMARY

Technical Problem

In the upper column, the clamp is deformed during the operation of the operation lever, but the cylindrical part continuous with the clamp is not deformed. In other words, much stress is concentrated at a boundary between the clamp and the cylindrical part. For this reason, an upper column is provided with a rib near the boundary to improve a rigidity near the boundary.

However, in the case in which the rigidity near the boundary is improved, one end of the clamp continuous with the cylindrical part is difficult to be deformed. In addition, in a case of deforming the one end of the clamp continuous with the cylindrical part, a load on the operation lever increases, and the feel of operation of the operation lever is heavy. By contrast, in a case of deforming the other end of the clamp spaced apart from the cylindrical part, a load on the operation lever decreases, and the feel of operation of the operation lever is light. In other words, in a case in which the upper column slides to change a position fastened by the fastening mechanism, the feel of operation of the operation lever is changed, which gives an operator a sense of discomfort.

The present disclosure has been made in view of the above problem, and an objective of the present disclosure is to provide a steering device that enables an operation lever to be operated with the same feel of operation even though an upper column slides to change a fastening position of the fastening mechanism.

Solution to Problem

According to one aspect of the present disclosure, there is provided a steering device comprising: a telescopic steering shaft that extends in a first direction; a steering column of a cylindrical outer shape configured to rotatably support the steering shaft; a bracket including a first side plate and a second side plate which are configured to sandwich the steering column from a second direction orthogonal to the first direction; and a fastening mechanism that has an operation lever and a fastening shaft penetrating the first side plate and the second side plate and configured to fasten the first side plate and the second side plate, wherein the steering column includes a lower column and an upper column that are relatively slidably coupled to each other in the first direction, the upper column includes: a clamp that has a slit extending in the first direction and that is configured to be externally slidably fitted to the lower column; a cylindrical part that extends from the clamp and configured to support the steering shaft; a pair of protrusions between which the slit is interposed, the protrusions protruding radially outward from the clamp and being fastened by the first side plate and the second side plate when fastened with the fastening mechanism; and a reinforcement rib that extends across an outer peripheral surface of the clamp and an outer surface of one of the protrusion, the clamp includes: a continuous clamp that is positioned near the cylindrical part and that is continuous with the cylindrical part; and a spaced clamp that is spaced apart from the cylindrical part, each of the protrusions includes: a continuous protrusion that protrudes from the continuous clamp; and a spaced protrusion that protrudes from the spaced clamp, and the reinforcement rib linearly extends from the spaced protrusion toward the continuous clamp.

In a case in which the pair of the spaced protrusions is fastened, one end of the reinforcement rib is drawn toward one of the spaced protrusion. The continuous clamp continuous with the other end of the reinforcement rib is also drawn toward one of the spaced protrusion. In other words, in a case in which the pair of spaced protrusions is fastened, a force for deforming the reinforcement rib and the continuous clamp is required in addition to the spaced clamp. As a result, a load on the operation lever increases, and the feel of operation of the operation lever is heavy. The reinforcement rib does not extend from the continuous protrusion. In other words, even though a pair of continuous protrusions is fastened, the feel of operation of the operation lever is not changed since the reinforcement rib is not drawn. As described above, by using the reinforcement rib, only the feel of operation in a case in which the pair of spaced protrusions is fastened can be heavy, without changing the feel of operation in a case in which the pair of continuous protrusions is fastened. Therefore, even though a position fastened by the fastening mechanism is changed, a difference in the feel of operation of the operation lever is small, which less causes discomfort to the operator.

Preferably, in one aspect of the steering device described above, the upper column includes a pair of first contact ribs each of which protrudes from the outer peripheral surface of the clamp, one of the first contact ribs being configured to be brought into contact with the first side plate and another of the first contact ribs being configured to be brought into contact with the second side plate when fastened with the fastening mechanism, and the reinforcement rib is continuous with one of the first contact rib.

According to the above-mentioned configuration, in the case in which the pair of spaced protrusions is fastened by the fastening mechanism, the first contact rib continuous with the reinforcement rib is also drawn toward one of the spaced protrusions. Thus, the load applied on the operation lever increases. As a result, in the case in which the pair of spaced protrusions is fastened, the feel of operation of the operation lever can be further heavier.

Preferably, in one aspect of the steering device described above, the upper column includes an extending part that extends from the spaced clamp toward an opposite side to the cylindrical part, an expansion slit is provided at a boundary between the spaced clamp and the extending part, the expansion slit being continuous with the slit of the clamp and extending in a peripheral direction to separate the spaced clamp from the extending part, the spaced clamp includes: a first-side spaced clamp that faces the first side plate; and a second-side spaced clamp that faces the second side plate, and a separation amount in the expansion slit between the second-side spaced clamp and the extending part is greater than that between the first-side spaced clamp and the extending part, and the reinforcement rib is disposed on the spaced protrusion which protrudes from the second-side spaced clamp.

The second-side spaced clamp is less affected by the rigidity of the adjacent extending part since the separation amount between the second-side spaced clamp and the extending part is greater than that between the first-side spaced clamp and the extending part. As a result, although a fastening force acts equally on the first-side spaced clamp and the second-side spaced clamp when fastened, the second-side spaced clamp is further greatly deformed. Therefore, much stress acting on the second-side spaced clamp increases, and damage may occur. However, according to the configuration described above, the reinforcement rib is disposed on the spaced protrusion protruding from the second-side spaced clamp. Therefore, when fastened, the spaced protrusion protruding from the second-side spaced clamp is difficult to move, and the deformation amount of the second-side spaced clamp is reduced. As a result, the deformation amount of the first-side spaced clamp and the second-side spaced clamp is equal when fastened. Thus, stress concentration on the second-side spaced clamp is avoided.

Advantageous Effects of Invention

The steering device of the present disclosure enables the operation lever to be operated with the same feel of operation even though the upper column slides to change the fastening position of the fastening mechanism.

BRIEF DESCRIPTION OF DRAWINGS

FIG. 10 is an enlarged side view of a part of the upper column enlarged.

DESCRIPTION OF EMBODIMENTS

Hereinafter, the present invention is described in detail with reference to the drawings. The present invention is not limited to the following embodiment (hereinafter referred to as an "embodiment"). In addition, components in the following embodiment include components capable of being readily assumed by those skilled in the art, components substantially identical, and components within the so-called equal range. Furthermore, the components disclosed in the following embodiment can be combined as appropriate.

Figure 1:
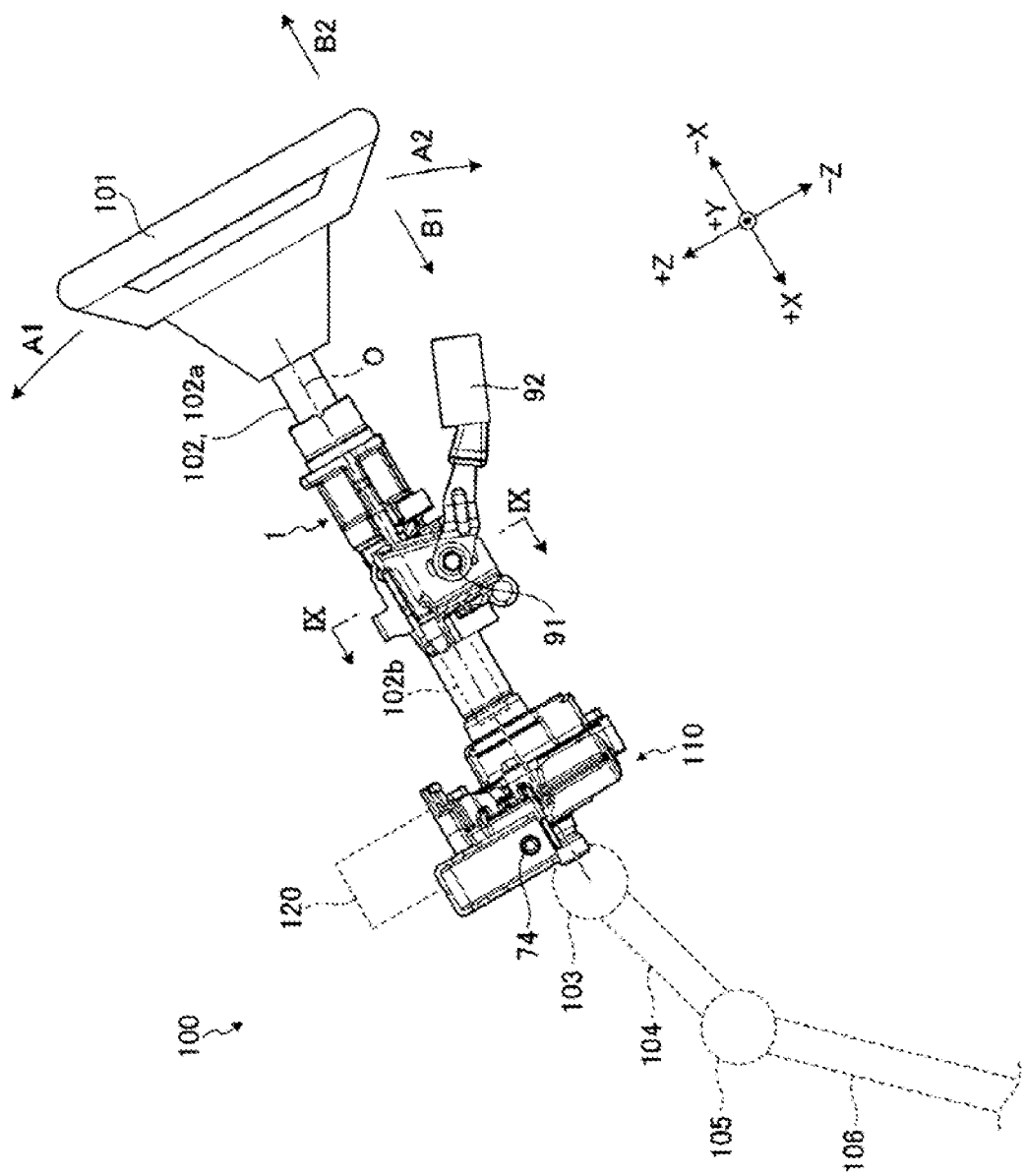
FIG. 1 is a side view of a steering device of the present embodiment.
Figure 2:
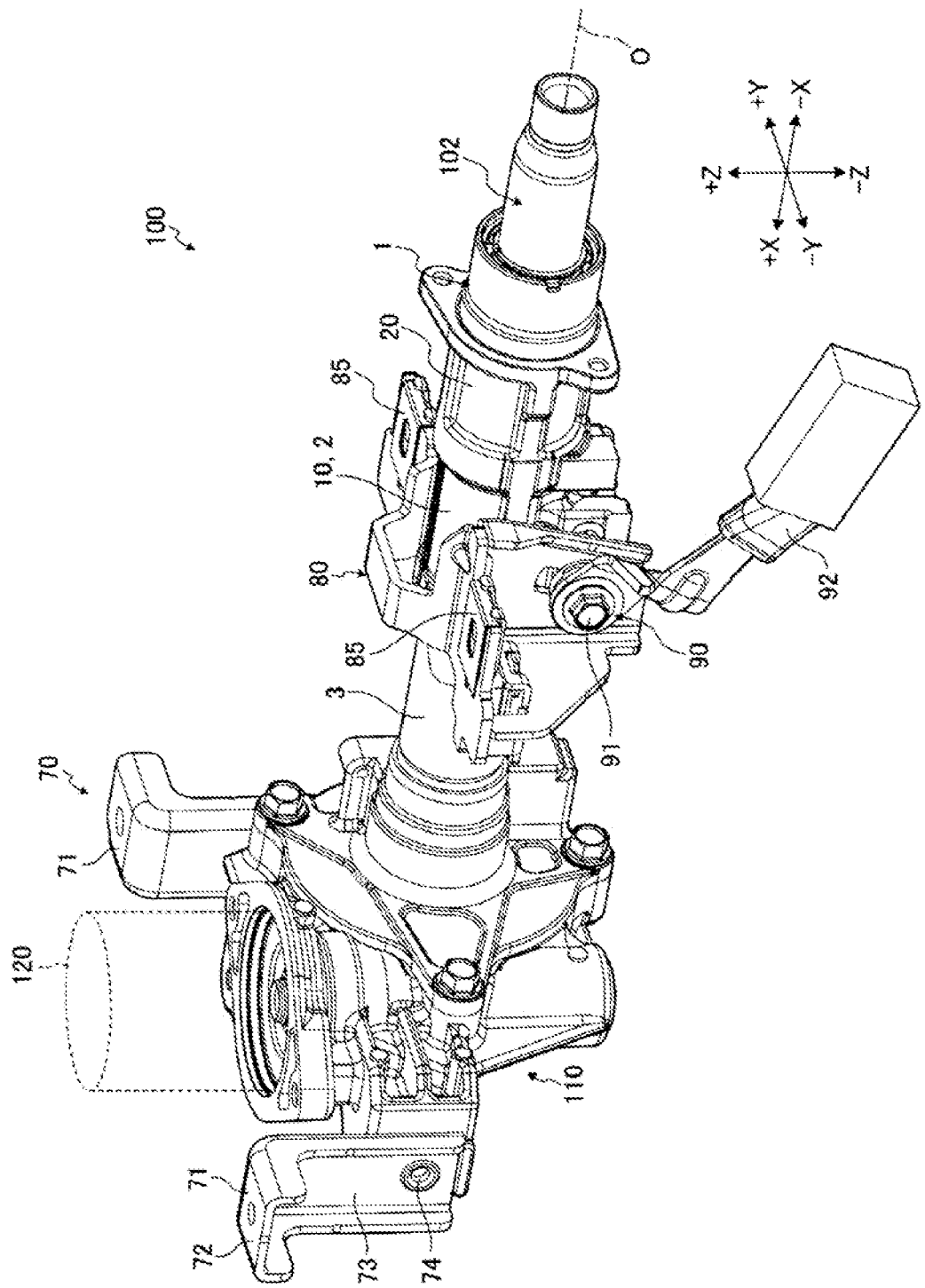
FIG. 2 is a perspective view of the steering device of the present embodiment.
Figure 3:
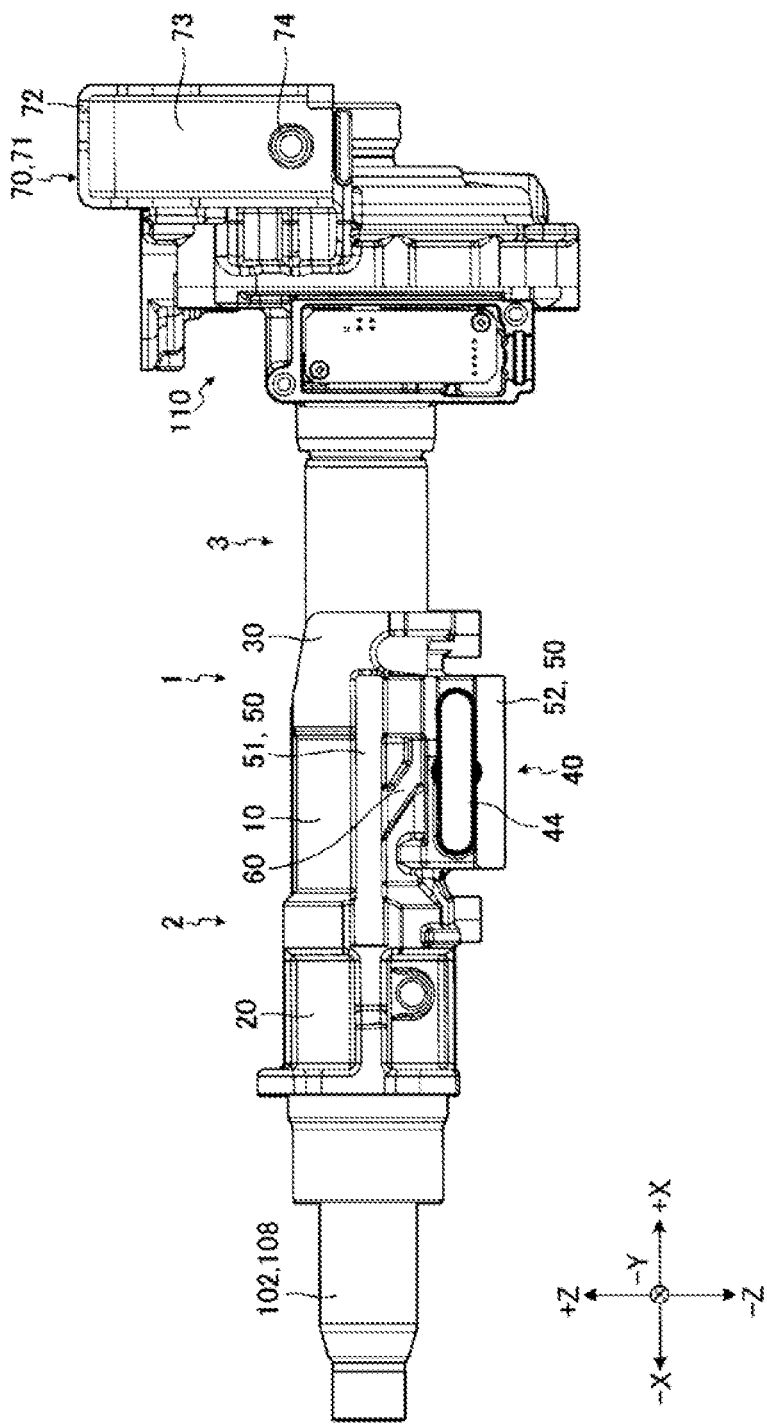
FIG. 3 is a side view of the steering device of the present embodiment.

FIG. 1 is a side view of a steering device of the present embodiment. FIG. 2 is a perspective view of the steering device of the present embodiment. FIG. 3 is a side view of the steering device of the present embodiment.

Figure 4:
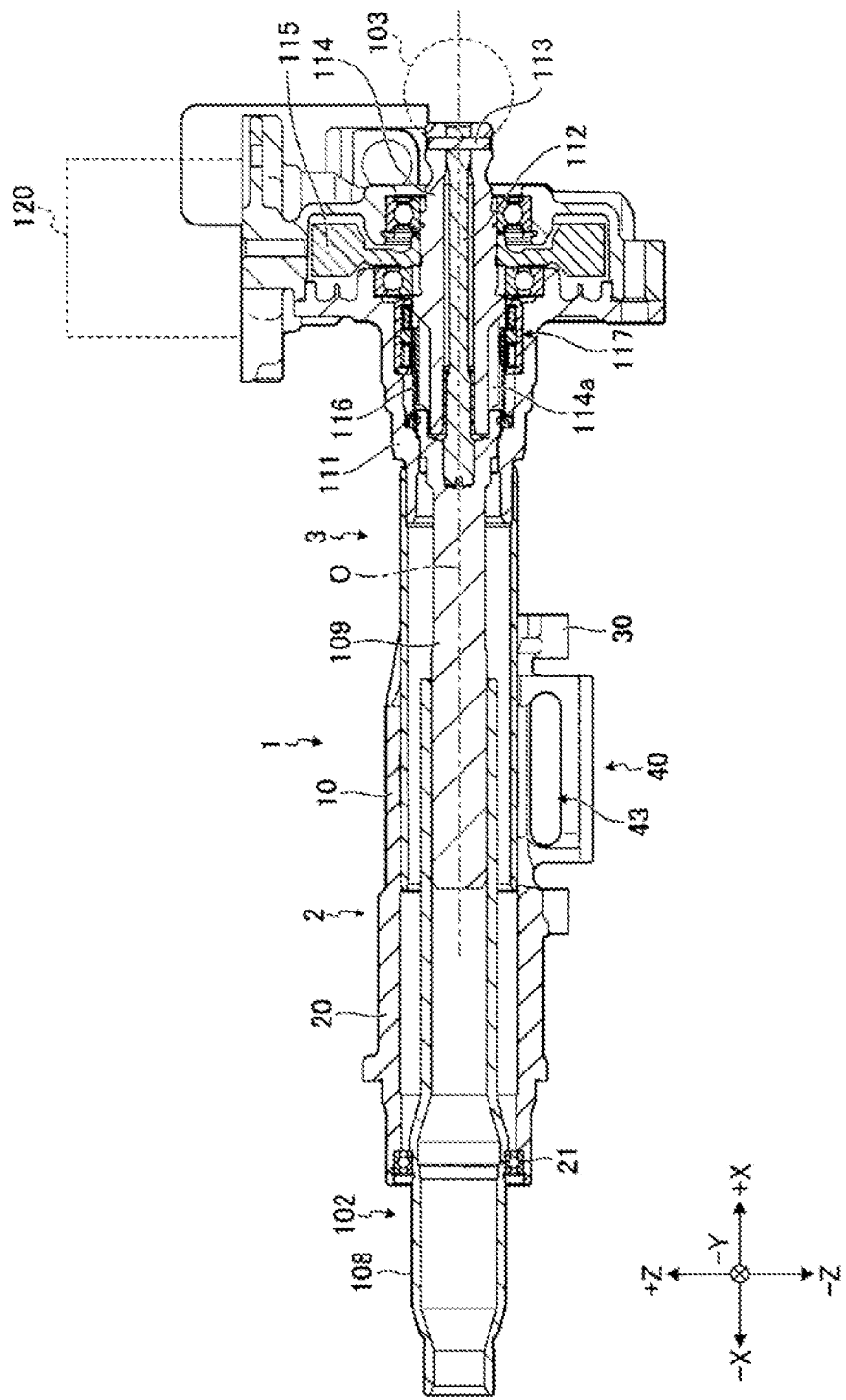
FIG. 4 is a cross-sectional view of the steering device cut along an axis illustrated in FIG. 3.
Figure 5:
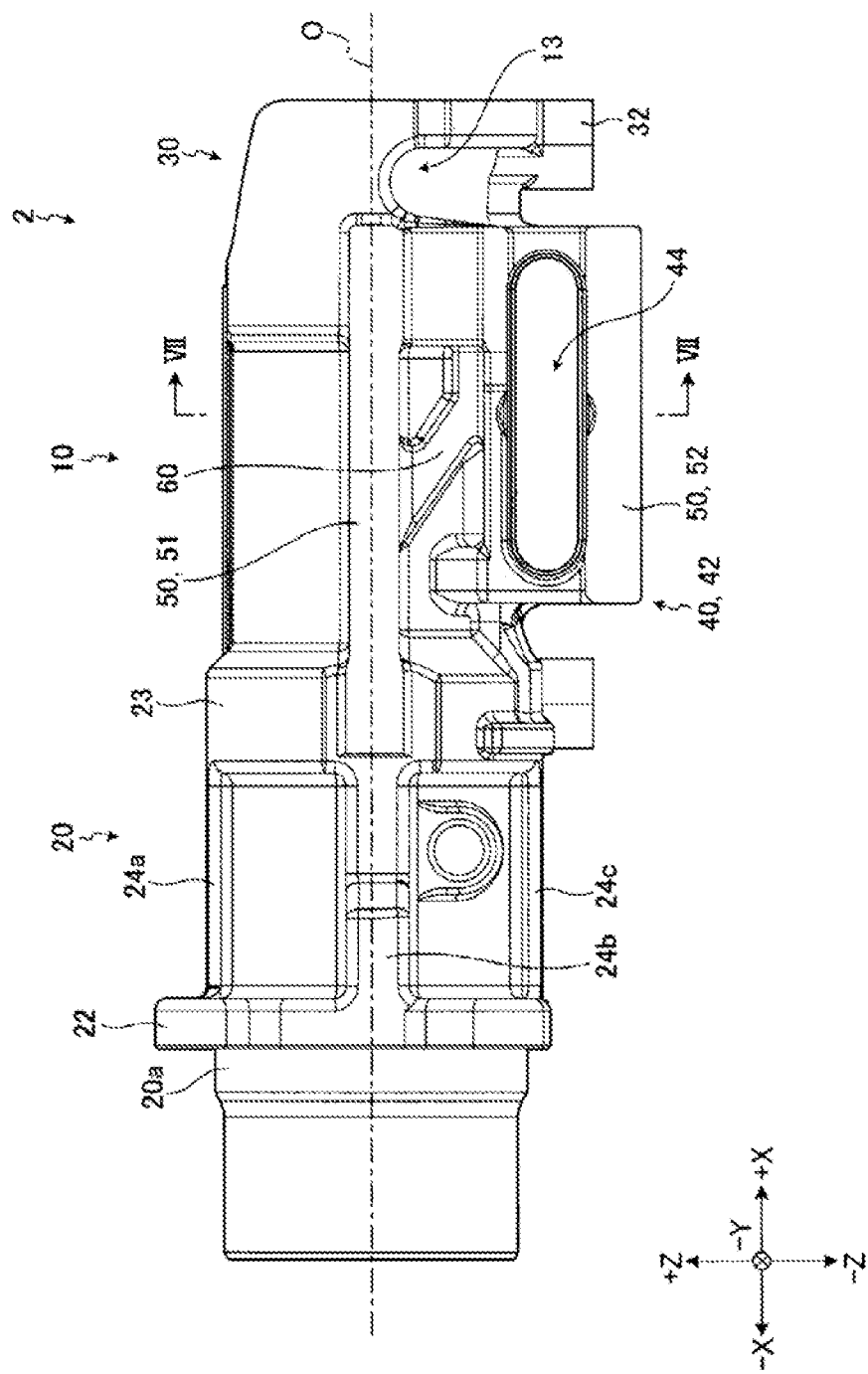
FIG. 5 is a side view of an upper column of the present embodiment.
Figure 6:
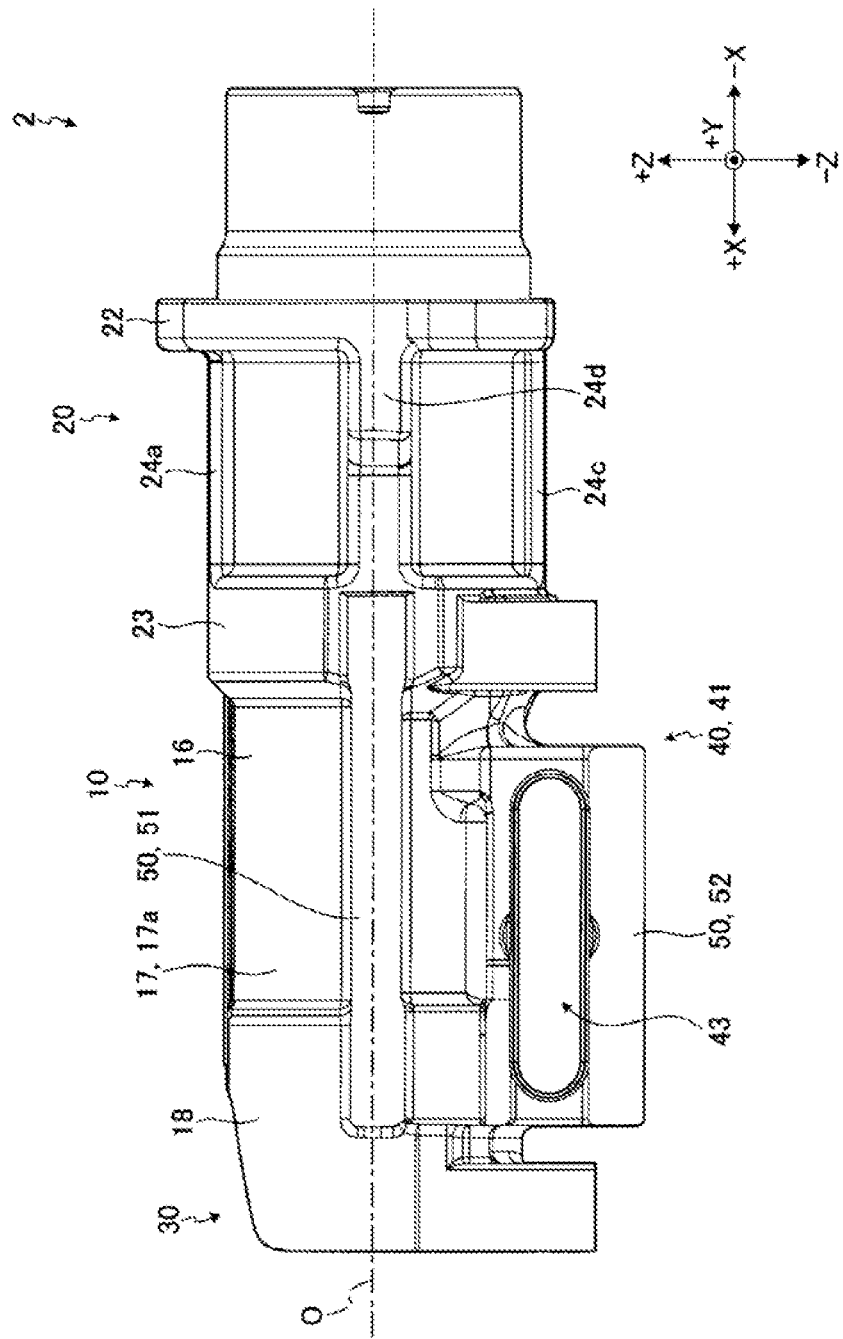
FIG. 6 is a side view of the upper column of the present embodiment.
Figure 7:
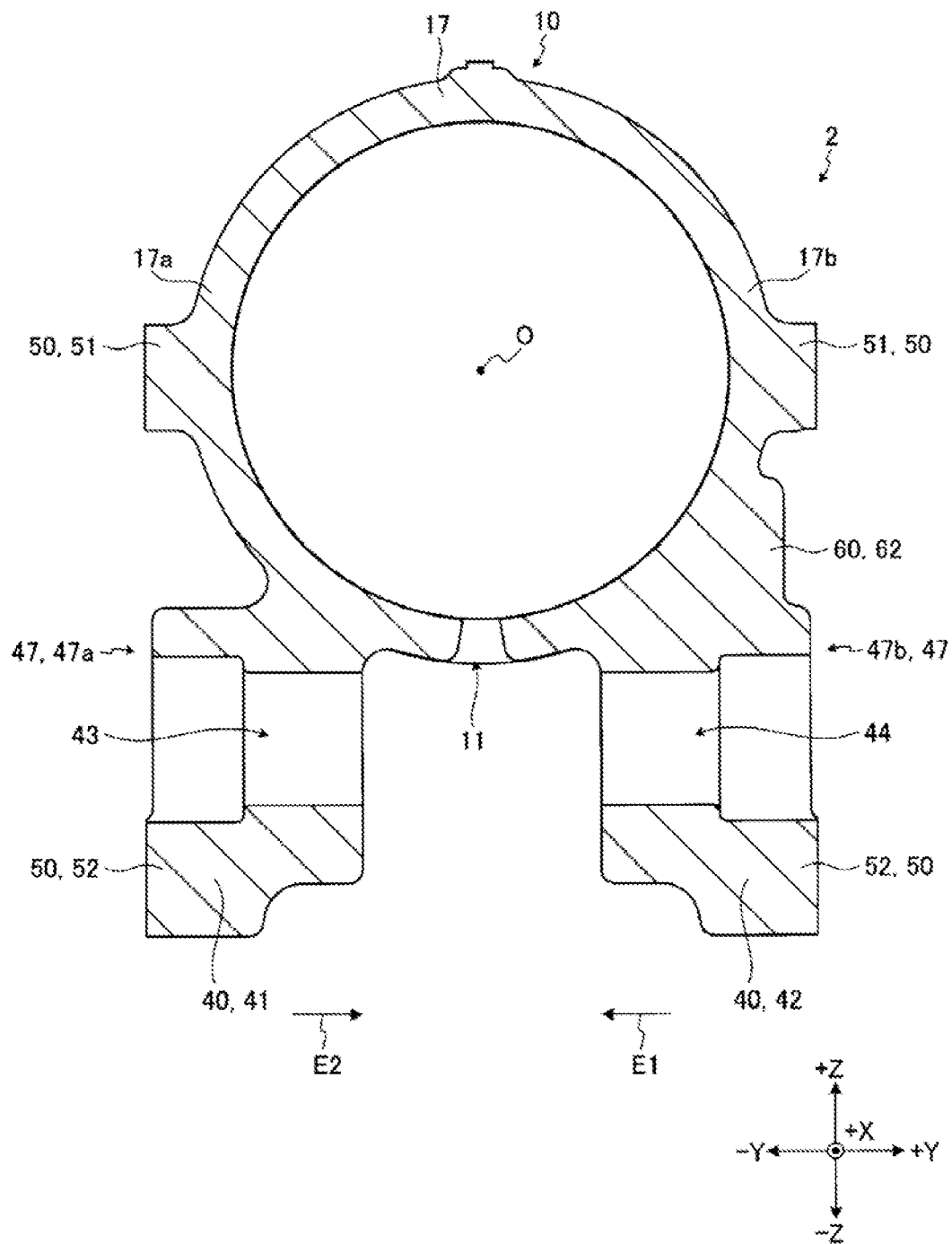
FIG. 7 is a cross-sectional view cut along VII-VII arrow line illustrated in FIG. 5.
Figure 8:
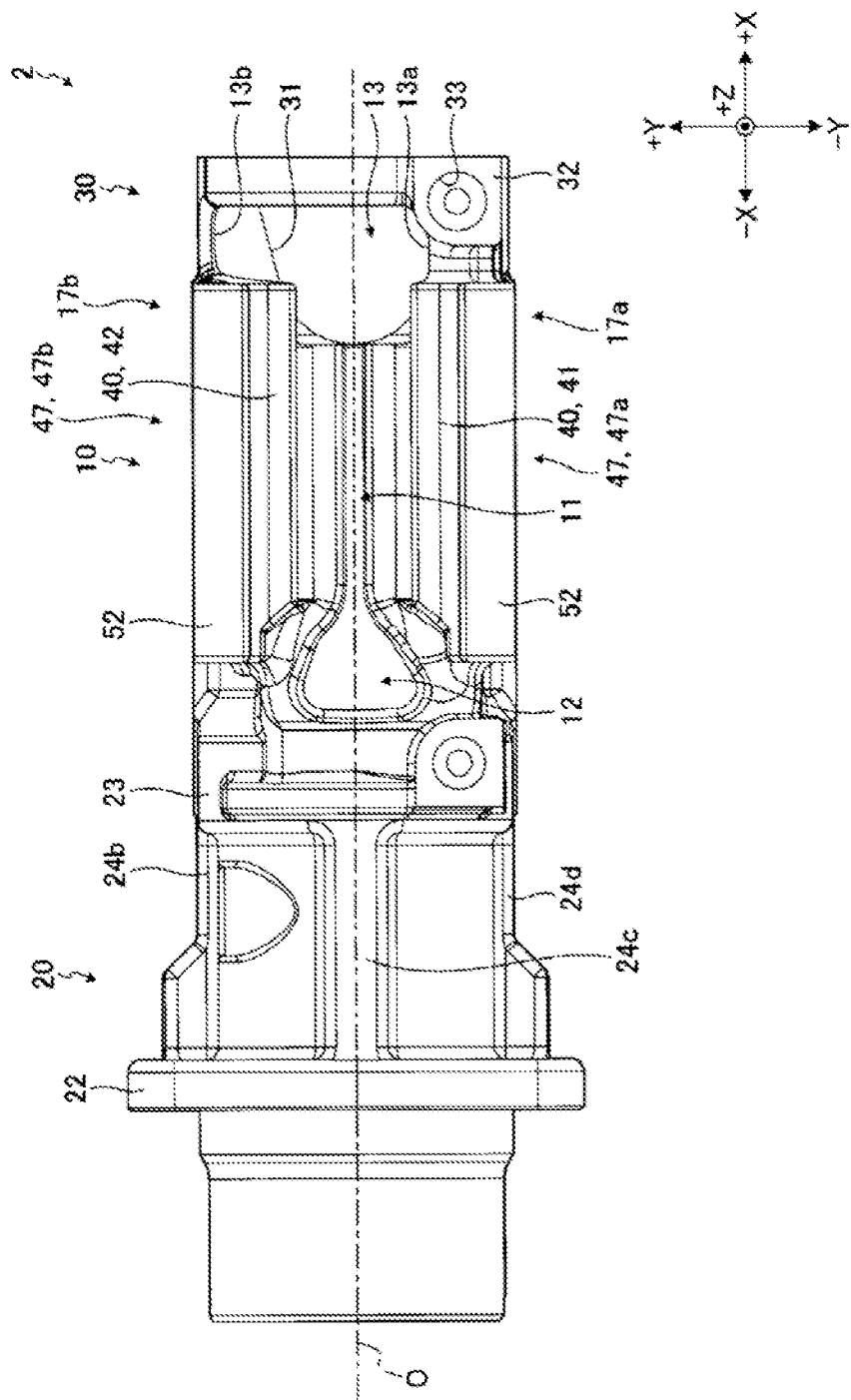
FIG. 8 is a bottom view of the upper column of the present embodiment.
Figure 9:
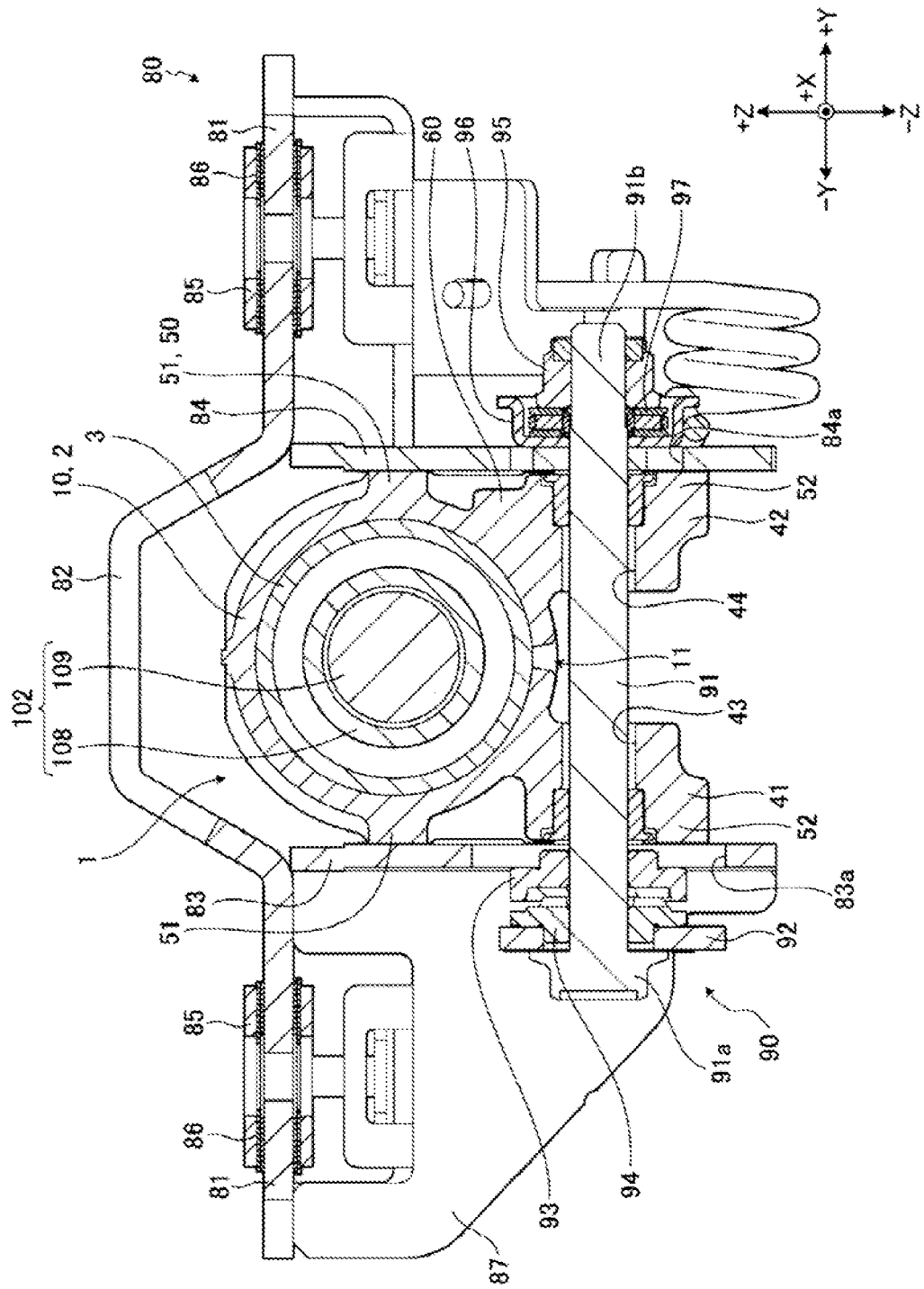
FIG. 9 is a cross-sectional view cut along IX-IX arrow line illustrated in FIG. 1.

FIG. 4 is a cross-sectional view of the steering device cut along an axis illustrated in FIG. 3. FIG. 5 is a side view of an upper column of the present embodiment. FIG. 6 is a side view of the upper column of the present embodiment. FIG. 7 is a cross-sectional view cut along VII-VII arrow line illustrated in FIG. 5. FIG. 8 is a bottom view of the upper column of the present embodiment. FIG. 9 is a cross-sectional view cut along IX-IX arrow line illustrated in FIG. 1. FIG. 10 is an enlarged side view of a part of the upper column enlarged.

First, a basic configuration of a steering device 100 is described. As illustrated in FIG. 1, the steering device 100 includes a steering wheel 101, a steering shaft 102, a first universal joint 103, an intermediate shaft 104, a second universal joint 105, and a pinion shaft 106.

The steering wheel 101 is attached to one end 102*a* of the steering shaft 102. In a case in which a driver operates the steering wheel 101, the steering shaft 102 rotates around an axis O, and an operation torque is applied to the steering shaft 102.

A gearbox 110 is interposed between the other end 102b of the steering shaft 102 and the first universal joint 103. An electric motor 120 is assembled with the gearbox 110 to apply an assist torque to the steering shaft 102. In other words, the steering device 100 of the present embodiment is an electric power steering device that assists steering of the driver by using the electric motor 120. The present invention may be applied to a steering device without the gearbox 110.

One end of the intermediate shaft 104 is coupled to the first universal joint 103. The pinion shaft 106 is coupled to the other end of the intermediate shaft 104 through the second universal joint 105. As described above, the operation torque of the steering shaft 102 is transmitted to the pinion shaft 106 through the first universal joint 103, the intermediate shaft 104, and the second universal joint 105.

As illustrated in FIG. 2, the steering device 100 further includes a steering column 1, a first bracket 70, a second bracket 80, and a fastening mechanism 90, in addition to the above-mentioned components. Next, the details of each component of the steering device 100 will be described. The XYZ Cartesian coordinate system is used in the following description. An X axis is parallel to the axis O of the steering shaft 102. A Y axis is parallel to a vehicle width direction of a vehicle on which the steering device 100 is mounted. A Z axis is perpendicular to both the X and Y axes. A direction parallel to the X axis is described as the X direction, a direction parallel to the Y axis is described as the Y direction, and a direction parallel to the Z axis is described as the Z direction. A direction toward the front of the vehicle in the X direction is a +X direction. In a case in which an operator faces the +X direction, the right direction is a +Y direction. The upward direction in the Z direction is a +Z direction. The X direction may be referred to as a first direction, and the Y direction may be referred to as a second direction.

As illustrated in FIG. 3, the steering shaft 102 is assembled in a state of protruding from an end of the steering column 1 in a −X direction. As illustrated in FIG. 4, the steering shaft 102 has an upper shaft 108 that is a cylindrical shaft, and a lower shaft 109 that is a solid shaft. The steering wheel (see FIG. 1) is attached to an end of the upper shaft 108 in the −X direction. An end of the upper shaft 108 in the +X direction is externally fitted to the lower shaft 109. The end of the upper shaft 108 in the +X direction and an end of the lower shaft 109 in the −X direction are spline-fitted to each other. Therefore, the upper shaft 108 can slide on the lower shaft 109 in the X direction.

An end of the lower shaft 109 in the +X direction enters an inside of a housing 111 of the gearbox 110. A torsion bar 112, an output shaft 114 that is an outer cylinder of the torsion bar 112, and a worm wheel 115 that is externally fitted to the output shaft 114 are provided inside the housing 111 of the gearbox 110. The worm wheel 115 is engaged with a worm (not illustrated) that is coupled to an output shaft of the electric motor 120. Therefore, in a case in which the electric motor 120 is driven, a torque is applied to the output shaft 114.

The end of the lower shaft 109 in the +X direction is coupled to an end of the torsion bar 112 in the −X direction. An end of the torsion bar 112 in the +X direction is coupled to the output shaft 114 by a fixing pin 113. The first universal joint 103 is coupled to an end of the output shaft 114 in the +X direction. Therefore, a steering torque of the lower shaft 109 is transmitted to the intermediate shaft 104 (see FIG. 1) through the torsion bar 112, the output shaft 114, and the first universal joint 103. The torsion bar 112 twists in response to the steering torque of the lower shaft 109, so that an angular difference in rotation between the lower shaft 109 and the output shaft 114 is made.

In order to eliminate the angular difference in rotation between the lower shaft 109 and the output shaft 114, a torque detection groove 114a is formed at an end of the output shaft 114 in the −X direction. A cylindrical member 116 is disposed on an outer peripheral side of the torque detection groove 114a. The cylindrical member 116 is fixed to the end of the lower shaft 109 in the + direction and is integrally rotated with the lower shaft 109. The cylindrical member 116 has multiple windows (not illustrated) penetrating in a radial direction. A torque sensor 117 is disposed on an outer peripheral side of the cylindrical member 116.

The torque sensor 117 transmits a detection result to a torque detection circuit board (not illustrated) that is provided inside the housing 111, and the torque detection circuit board detects the angular difference in rotation between the lower shaft 109 and the output shaft 114. The torque detection circuit board causes the electric motor 120 to be driven based on the detection result to provide a steering assist torque to the output shaft 114. As a result, the same angle in rotation between the lower shaft 109 and the output shaft 114 is achieved.

As illustrated in FIG. 2, the first bracket 70 includes a pair of support pieces 71 and 71. The support pieces 71 are spaced apart from each other in the Y direction. Each of the support pieces 71 includes an attachment plate 72 extending in the X direction and the Y direction and a support plate 73 extending in the X direction and the Z direction. The attachment plate 72 is fixed to a vehicle body by a bolt (not illustrated). A pivot shaft 74 extending in the Y direction is rotatably provided at an end of the support plate 73 in the −Z direction. The gearbox 110 is fixed to the pivot shaft 74. Thus, the gearbox 110, the steering shaft 102, the steering column 1, and the steering wheel 101 are supported by the first bracket 70 to be able to rotate around the pivot shaft 74 (see arrows A1 and A2 in FIG. 1).

As illustrated in FIG. 4, the steering column 1 is an outer cylinder that extends in the X direction and surrounds the steering shaft 102. The steering column 1 includes an upper column 2 that is a column disposed near the steering wheel 101, and a lower column 3 that is a column disposed in the +X direction with respect to the upper column 2, and that is spaced apart from the steering wheel 101. The lower column 3 has a cylindrical shape. An end of the lower column 3 in the +X direction is externally fitted to the housing 111 of the gearbox 110.

The upper column 2 is produced by casting. As illustrated in FIGS. 3, 4, 5, and 6, the upper column 2 includes a clamp 10 that is externally fitted to the lower column 3, a cylindrical part 20 that extends from the clamp 10 in the −X direction, an attachment part 30 that is provided at an end of the clamp 10 in the +X direction, a pair of protrusions 40 and 40 (only one protrusion is illustrated in FIG. 5, see FIG. 6) that protrudes in the −Z direction from the outer peripheral surface of the clamp 10, contact ribs 50 (see FIGS. 3, 5, and 6) that extend in the X direction, and a reinforcement rib 60 that extends across an outer peripheral surface of the clamp 10 and an outer surface of the one protrusion 40.

The cylindrical part 20 has a circular inner peripheral surface. An inner diameter of the cylindrical part 20 has a size enough to allow the lower column 3 to enter the inside. A bearing 21 is internally fitted to an end of the cylindrical part 20 in the −X direction. The cylindrical part 20 rotatably supports the upper shaft 108 by using the bearing 21. In addition, an opening at the end of the cylindrical part 20 in the −X direction is blocked by the bearing 21 and the upper shaft 108.

As illustrated in FIGS. 5 and 6, a first annular rib 22 and a second annular rib 23 that are disposed to be spaced apart from each other in the X direction are provided on an outer peripheral surface 20a of the cylindrical part 20. Four straight linear ribs 24a, 24b, 24c, and 24d that extend in the X direction are provided at a 90-degree interval on the outer peripheral surface 20a of the cylindrical part 20 and between the first annular rib 22 and the second annular rib 23. Thus, the rigidity of the cylindrical part 20 is very high. The second annular rib 23 is provided at the boundary between the clamp 10 and the cylindrical part 20.

As illustrated in FIG. 7, the clamp 10 is provided with a slit 11. As illustrated in FIG. 8, the slit 11 of the clamp 10 extends in the X direction. Therefore, the clamp 10 has a circular arc-shaped cross-section and extends in the X direction. While no external force acts on the clamp 10, the inner diameter of the clamp 10 is approximately the same in size as the outer diameter of the lower column 3. In other words, the clamp 10 is slidable on the lower column 3.

As illustrated in FIG. 7, the slit 11 of the clamp 10 is positioned in the −Z direction as viewed from the axis O. Therefore, a groove width of the slit 11 is along the Y direction. According to this, in a case in which a compressive load for fastening the clamp 10 from the Y direction acts on the clamp 10, the clamp 10 deforms so that the groove width of the slit 11 is narrower. In other words, the clamp 10 clamps the lower column 3 disposed therein by reducing its diameter. As a result, a high frictional force acts between an inner peripheral surface of the clamp 10 and an outer peripheral surface of the lower column 3 to restrict the sliding of the upper column 2.

As illustrated in FIGS. 8 and 10, a part of the attachment part 30 in the +Z direction includes a cut-out portion 31. As illustrated in FIG. 8, the attachment part 30 wraps around the lower column 3 in an arc shape in the −Z direction. An attachment rib 32 is provided on an outer peripheral surface of the attachment part 30, which faces the −Z direction. The attachment rib 32 has a female thread hole 33. A bracket (not illustrated) that supports a harness or the like is attached to the female thread hole 33. The attachment part 30 may be referred to as the extending part.

A first expansion slit 12 and a second expansion slit 13 whose groove widths are circumferentially wider than that of the slit 11 are provided at both ends of the slit 11 of the clamp 10 in the X direction. Parts of the clamp 10, which are not continuous with the adjacent cylindrical part 20 and the adjacent attachment part 30 in the X axis direction, increase by the first expansion slit 12 and the second expansion slit 13. As a result, the clamp 10 is less affected by the rigidity of the cylindrical part 20 and the attachment part 30 and is further easily deformable. The second expansion slit 13 may be referred to simply as an expansion slit. Another configuration of the clamp 10 and the reinforcement rib 60 will be described later.

As illustrated in FIG. 8, the pair of protrusions 40 and 40 is disposed so that the slit is interposed therebetween as viewed from the −Z direction. Hereinafter, the one protrusion 40 of the pair of protrusions 40 and 40, which is disposed in the −Y direction relative to the slit 11, is referred to as a first protrusion 41, and the other protrusion 40 of the pair of protrusions 40 and 40, which is disposed in the +Y direction relative to the slit 11, is referred to as a second protrusion 42. The first protrusion 41 and the second protrusion 42 extend in the X direction with approximately the same length as that of the clamp 10. As illustrated in FIGS. 5 and 6, long grooves 43 and 44 extending in the X direction are provided. As illustrated in FIG. 7, the long grooves 43 and 44 penetrate in the Y direction.

As illustrated in FIGS. 5, 6, and 7, the contact ribs 50 each have a pair of first contact ribs 51 and 51 and a pair of second contact ribs 52 and 52. The first contact ribs 51 protrude from the outer peripheral surface of the clamp 10. The second contact ribs 52 are provided to protrude from outer surfaces of the first protrusion 41 and the second protrusion 42, respectively.

As illustrated in FIG. 5, the first contact ribs 51 and the second contact ribs 52 extend in a straight line in the X direction. The first contact ribs 51 overlap the axis O as viewed from the Y direction. Each end of each first contact rib 51 in the −X direction is continuous with a second annular rib 23. The second contact ribs 52 are positioned at ends of the first protrusion 41 and the second protrusion 42 in the −Z direction, respectively. The second contact ribs 52 extend along edges of the long grooves 43 and 44. As described above, the first contact ribs 51 and the second contact ribs 52 are disposed so that the long grooves 43 and 44 are interposed therebetween.

As illustrated in FIG. 9, the second bracket 80 includes a pair of attachment plates 81 and 81, an upper plate 82, a first side plate 83, and a second side plate 84. The second bracket 80 may be referred to simply as a bracket.

The pair of attachment plates 81 and 81 is plate-like members that are disposed to be spaced apart from each other in the Y direction so that the steering column 1 is interposed therebetween. The attachment plates 81 are coupled to the vehicle body by using release capsules 85. Each of the release capsules 85 is disposed at an end of each of the attachment plates 81 in the −X direction. Each of the release capsules 85 is integrated with each of the attachment plates 81 by using each of resin members 86. The release capsules 85 are fixed to a member on the vehicle body side by bolts or the like. In a case in which a load in the +X direction acts on the steering column 1 due to a secondary collision of the vehicle (see arrow B1 in FIG. 1), the resin members 86 are sheared and only the attachment plates 81 move in the +X direction; thereby, the second bracket 80 is released from the vehicle body.

The upper plate 82 is a plate-like member that couples the pair of attachment plates 81 and 81 to each other. The first side plate 83 and the second side plate 84 are plate-like members that extend in the X direction and the Z direction. The first side plate 83 is disposed in the −Y direction relative to the clamp 10. The second side plate 84 is disposed in the +Y direction relative to the clamp 10. In other words, the first side plate 83 and the second side plate 84 are spaced apart from each other in the Y direction so that the clamp 10 of the steering column 1 is interposed therebetween. The first side plate 83 and the second side plate 84 are integrated with the pair of attachment plates 81 and 81, and the upper plate 82 by welding. The first side plate 83 and the second side plate 84 are formed with arc grooves 83a and 84a that extend in the Z direction, respectively. The arc grooves 83a and 84a have an arc shape centered on the pivot shaft 74 (see FIGS. 1, 2, and 3). A protruding plate 87 that protrudes in the −Y direction is provided at an end of the first side plate 83 in the +X direction. Therefore, the first side plate 83 has a higher rigidity in the Y direction than the second side plate 84 does.

The fastening mechanism 90 is a device that fastens the clamp 10 to apply a compressive load to the clamp 10. The fastening mechanism 90 has a fastening shaft 91, an operation lever 92, a fixed cam 93, a rotating cam 94, a nut 95, a spacer 96, and a thrust bearing 97.

The fastening shaft 91 is a rod-shaped member. The fastening shaft 91 is inserted, from the −Y direction toward the +Y direction, into the arc groove 83a of the first side plate 83, the long grooves 43 and 44 of the clamp 10, and the arc groove 84a of the second side plate 84 in this order, and extends in the Y direction. An end of the fastening shaft 91 in the −Y direction is provided with a head 91a. The operation lever 92 is coupled near the end of the fastening shaft 91 in the −Y direction. The operation lever 92 extends from the fastening shaft 91 in the −X direction and can be operated by the driver in the vehicle (see FIGS. 1 and 2). In a case in which the driver rotates the operation lever 92 around the fastening shaft 91, the fastening shaft 91 is rotated in conjunction with the rotation of the operation lever 92.

The fixed cam 93 and the rotating cam 94 are disposed between the first side plate 83 and the operation lever 92 in a state of being penetrated by the fastening shaft 91. The fixed cam 93 is adjacent to the first side plate 83. A part of the fixed cam 93 is fitted to the arc groove 83a of the first side plate 83. Accordingly, the fixed cam 93 is not rotated in conjunction with the fastening shaft 91. The rotating cam 94 is adjacent to the operation lever 92. The rotating cam 94 is coupled to the operation lever 92 and is integrally rotated with the operation lever 92. Tilted planes are provided on surfaces of the fixed cam 93 and the rotating cam 94, which face each other, along the peripheral direction. In a case in which the rotating cam 94 is rotated by operation of the operation lever 92, the tilted plane of the fixed cam 93 rides up or rides down on the tilted plane of the rotating cam 94. As a result, a distance in the Y direction between the fixed cam 93 and the rotating cam 94 changes.

An end of the fastening shaft 91 in the +Y direction is provided with a male thread 91b. This male thread 91b is screwed with the nut 95. As a result, the fastening shaft 91 is prevented from falling out of the arc grooves 83a and 84a and the long grooves 43 and 44. The spacer 96 and the thrust bearing 97 are disposed between the second side plate 84 and the nut 95 in a state of being penetrated by the fastening shaft 91. The spacer 96 is brought into contact with the periphery of the arc groove 84a, which is a part of the second side plate 84. The thrust bearing 97 is disposed between the nut 95 and the spacer 96.

As described above, in a case in which the fixed cam 93 and the rotating cam 94 are spaced apart from each other in the Y direction by the operation of the operation lever 92, the head 91a of the fastening shaft 91 is pressed in the −Y direction, and the nut 95 moves toward the −Y direction. Accordingly, a distance in the Y direction between the fixed cam 93 and the spacer 96 is reduced, and a frictional force between the fixed cam 93 and the first side plate 83, and a frictional force between the spacer 96 and the second side plate 84 increase. As a result, the movement of the fastening shaft 91 in the Z direction along the arc grooves 83a and 84a is restricted. Therefore, the movement of the upper column 2 in the Z direction, which is penetrated by the fastening shaft 91, is also restricted, and a position of the steering wheel 101 in the Z direction is secured. Each component that is fastened by the operation of the operation lever 92 to move in the Y direction moves closer toward the first side plate 83 having a higher rigidity against the Y direction than the second side plate 84. In other words, the first side plate 83 is a reference plane that does not displace in the Y direction when the fastening force is applied.

The first side plate 83 and the second side plate 84 are fastened in the Y direction by the fixed cam 93 and the spacer 96. Thus, inner surfaces of the first side plate 83 and the second side plate 84 are brought into contact with the pair of second contact ribs 52 and 52 of the upper column 2. The first side plate 83 and the second side plate 84 press the pair of second contact ribs 52 to be compressed against each other. As a result, a compressive load is applied to the first protrusion 41 and the second protrusion 42 in the Y direction. The groove width of the slit 11 of the clamp 10 is narrower to clamp the lower column 3. As a result, the upper column 2 is secured to the lower column 3, and the movement of the steering wheel 101 in the X direction is restricted.

The first side plate 83 and the second side plate 84 press the pair of first contact ribs 51 and 51 in addition to the pair of second contact ribs 52 and 52. As a result, a compressive load acts on the pair of second contact ribs 52 and 52 to be able to reduce the diameter of the clamp 10. The first contact ribs 51 are spaced apart from the fastening shaft 91 on which a fastening force acts. Therefore, the compressive load acting on the first contact ribs 51 is smaller than the compressive load acting on the second contact ribs 52. On the other hand, even though the compressive load is applied to the second contact ribs 52, the first protrusion 41 and the second protrusion 42 are tilted so that only the ends of the first protrusion 41 and the second protrusion 42 in the −Z direction are close to each other, thereby, the slit 11 of the clamp 10 may not be narrowed. In other words, the compressive load can be applied to the clamp 10 by using the first contact ribs 51 without using the first protrusion 41 and the second protrusion 42. Therefore, during the operation of the operation lever 92, the clamp 10 reliably clamps the lower column 3.

By contrast, in a case in which the operation lever 92 is operated to bring the fixed cam 93 and the rotating cam 94 close to each other in the Y direction, the distance in the Y direction between the fixed cam 93 and the spacer 96 is increased. Thus, a frictional force between the fixed cam 93 and the first side plate 83 is reduced. Accordingly, a frictional force between the spacer 96 and the second side plate 84 is reduced. As a result, the fastening shaft 91 is allowed to move in the Z direction along the arc grooves 83a and 84a. In a case in which a load in the Z direction is applied to the steering wheel 101, the steering column 1, the steering shaft 102, and the gearbox 110 are rotated around the pivot shaft 74 in directions of arrow A1 or arrow A2 (see FIG. 1). As a result, a position of the steering wheel 101 in the Z direction is changed.

Fastening on the first contact ribs 51 and second contact ribs 52 by the first side plate 83 and the second side plate 84 is released. Therefore, the groove width of the slit 11 of the clamp 10 is widened, and clamping onto the lower column 3 is released. In a case in which a load in the X direction is applied to the steering wheel 101, the upper column 2 and the upper shaft 108 slide in the X direction. As a result, a position of the steering wheel 101 in the X direction is changed (see arrow B1 and arrow B2 in FIG. 1).

Next, the details of the clamp 10 and the reinforcement rib 60 will be described. A cross-sectional shape of the clamp 10 cut in a plane extending in the Y direction and the Z direction has substantially the same shape even through a cut position is moved in the X direction. In other words, the rigidity of each portion of the clamp 10 in the X direction is approximately uniform. However, as illustrated in FIG. 10, an end of the clamp 10 in the −X direction is continuous with the cylindrical part 20 in which the second annular rib 23 is provided. As a result, the end of the clamp 10 in the −X direction has an apparent high rigidity by the second annular rib 23, and is less deformable than other parts of the clamp 10. As described above, the clamp 10 is composed of a continuous clamp 16 that is positioned near the cylindrical part 20 and that is less deformable, and a spaced clamp 17 that is spaced apart from the cylindrical part 20 in the X direction and that is easily deformable. Each of the protrusions 40 includes a continuous protrusion 46 protruding from the continuous clamp 16 and a spaced protrusion 47 protruding from the spaced clamp 17.

To clarify the boundary between the continuous clamp 16 and the spaced clamp 17, a boundary line H is drawn in FIG. 10. In the present embodiment, in the clamp 10, one-third of the clamp 10 is composed of the continuous clamp 16, and the remaining two-thirds is composed of the spaced clamp 17. Here, the ratio of the continuous clamp 16 to the spaced clamp 17 described above is an example. In other words, the clamp of the present invention is not limited thereto, and the boundary line H may be drawn at the center of the clamp 10 in the X direction. Furthermore, the continuous clamp 16 that is less deformable since it is continuous with the cylindrical part 20 is exemplified in the present embodiment, but the continuous clamp 16 of the present invention can also be applied to a case in which the continuous clamp 16 is less deformable since a wall thickness of a part of the clamp 10 is thicker than that of the other part of the clamp 10.

As illustrated in FIG. 10, an end of the spaced clamp 17 in the +X direction is continuous with the attachment part 30. The attachment part 30 includes the cut-out portion 31 and has extremely low rigidity. Therefore, in each portion of the spaced clamp 17 in the X direction, the end in the +X direction, which is continuous with the attachment part 30, is the most easily deformable portion. Hereinafter a portion of the spaced clamp 17, which is positioned at the end of the spaced clamp 17 in the +X direction, is referred to as a farthest clamp 18.

As illustrated in FIG. 7, the spaced clamp 17 is composed of a first-side spaced clamp 17a and a second-side spaced clamp 17b. The first-side spaced clamp 17a is disposed in the −Y direction with respect to the axis O and faces the first side plate 83 (see FIG. 9) in a case in which the spaced clamp 17 is divided into two parts in the Y direction with the axis O set as the boundary line. The second-side spaced clamp 17b is disposed in the +Y direction with respect to the axis O and faces the second side plate 84 (see FIG. 9).

The second-side spaced clamp 17b is further easily deformable than the first-side spaced clamp 17a. As illustrated in FIG. 8, the reason for this is that for the cut-out amount of the second expansion slit 13 in the Y direction, the cut-out amount in the +Y direction is greater than that in the −Y direction. In other words, in a case in which the second expansion slit 13 is viewed from the −Z direction, an edge 13a of the second expansion slit 13 in the −Y direction is closer to the axis O than an edge 13b of the second expansion slit 13 in the +Y direction. Therefore, the separation amount between the second-side spaced clamp 17b and the attachment part 30 in the second expansion slit 13, is greater than that between the first-side spaced clamp 17a and the attachment part 30. As a result, the second-side spaced clamp 17b is less affected by the rigidity provided by the attachment part 30 and is further easily deformable than the first-side spaced clamp 17a.

As illustrated in FIG. 7, a first-side spaced protrusion 47a of a pair of the spaced protrusions 47 and 47 is continuous with the first-side spaced clamp 17a. A second-side spaced protrusion 47b is continuous with the second-side spaced clamp 17b.

As illustrated in FIGS. 5 and 6, the reinforcement rib 60 is provided only on the second protrusion 42 of the pair of protrusions 40 and 40. In other words, the reinforcement rib 60 is not provided on the first protrusion 41. As illustrated in FIG. 10, the reinforcement rib 60 is disposed between the first contact rib 51 and the long groove 44 as viewed from the +Y direction. A length of the reinforcement rib 60 in the X direction is shorter than the long groove 44. The reinforcement rib 60 does not protrude beyond the contact rib 50 so as not to contact with the second side plate 84 (see FIGS. 7 and 9).

The reinforcement rib 60 is composed of a first reinforcement rib 61 that extends in the X direction as viewed from the Y direction, and a second reinforcement rib 62 that linearly extends while inclined to be positioned in the +Z direction as the second reinforcement rib 62 extends toward the −X direction. The second reinforcement rib 62 may be referred to simply as a reinforcement rib below. The first reinforcement rib 61 is provided on the spaced protrusion 47 and extends in the X direction along an edge of the long groove 44.

An end of the second reinforcement rib 62 in the +X direction is positioned on the spaced protrusion 47 and is continuous with the first reinforcement rib 61. An end of the second reinforcement rib 62 in the −X direction is positioned on the continuous clamp 16 and is continuous with the first contact rib 51. Thus, the second reinforcement rib 62 extends across the boundary line H to the spaced protrusion 47 and to the continuous clamp 16.

In detail, as viewed from the Y direction, the second reinforcement rib 62 is inclined along an imaginary line N. Here, the imaginary line N is obtained as follows: an imaginary line is drawn in the +Z direction from a center of the fastening shaft 91 positioned at an end of the long groove 44 in the −X direction (see an imaginary line J91 in FIG. 10) to obtain an intersection point J where the imaginary line intersects with the axis O; and this intersection point J is connected to a center of the fastening shaft 91 positioned at an end of the long groove 44 in the +X direction (see an imaginary line K91 in FIG. 10) to obtain the imaginary line N.

Next, the effect of the second reinforcement rib 62 will be described. In a case in which the operation lever 92 (see FIGS. 1 and 2) is operated and the fastening force of the fastening mechanism 90 acts on the pair of spaced protrusions 47 and 47, the pair of spaced protrusions 47 moves closer to each other (see arrows E1 and E2 in FIG. 7). The end of the second reinforcement rib 62 in the +X direction is provided on the spaced protrusion 47. Thus, the end of the second reinforcement rib 62 in the +X direction is drawn to the −Y direction (see arrow E1 in FIG. 7). As illustrated in FIG. 10, a tensile load acts on the second reinforcement rib 62 and causes the second reinforcement rib 62 to be drawn in a direction to extend (see arrow E3 in FIG. 10).

The continuous clamp 16 is drawn by the second reinforcement rib 62 since the continuous clamp 16 is continuous with the second reinforcement rib 62. Therefore, the tensile load also acts on the continuous clamp 16 (see arrow E4 in FIG. 10). Furthermore, since the second reinforcement rib 62 is continuous with the contact rib 51, the tensile load also acts on the first contact rib 51 (see arrow E5 in FIG. 10). As described above, in a case in which the pair of spaced protrusions 47 and 47 is fastened, a force for deforming the second reinforcement rib 62, the continuous clamp 16, and the first contact rib 51 is required in addition to a force for deforming the spaced clamp 17 of the clamp 10. As a result, a load on the operation lever 92 increases, and the feel of operation of the operation lever 92 is heavy.

On the other hand, the end of the second reinforcement rib 62 in the X direction is not provided on a pair of the continuous protrusions 46 and 46. Therefore, even though the pair of continuous protrusions 46 and 46 is fastened, no tensile load acts on the second reinforcement rib 62, and as a result, the feel of operation of the operation lever 92 is not heavy. As described above, by using the second reinforcement rib 62, the feel of operation in the case in which the pair of continuous protrusions 46 and 46 is fastened cannot be heavy, and only the feel of operation in the case in which the pair of spaced protrusions 47 is fastened can be heavy. Therefore, even though the fastening position of the fastening mechanism 90 is changed, the difference in the feel of operation of the operation lever 92 is small, and the operation lever 92 can be operated with the same feel of operation.

The force required to deform the second reinforcement rib 62 depends on a position of the fastening shaft 91. In a case in which the fastening shaft 91 is disposed on the extension line of the second reinforcement rib 62 (see imaginary line K91 in FIG. 10), the force for deforming the second reinforcement rib 62 is greatest. In other words, in a case in which the fastening position is changed within the range of the pair of spaced protrusions 47 and 47, a load of the second reinforcement rib 62 applied to the operation lever 92 is greatest in a case in which the fastening shaft 91 is positioned at an end of the long groove 44 in the +X direction.

On the other hand, in a case in which the fastening shaft 91 is disposed at the end of the long groove 44 in the +X direction, and the pair of spaced protrusions 47 and 47 is fastened, the farthest clamp 18 of the spaced clamp 17 is deformed. A force required to deform the farthest clamp 18 is the smallest force of that applied to the spaced clamp 17. Therefore, the feel of operation of the operation lever 92 may be the lightest. However, in this case, the load of the second reinforcement rib 62 applied to the operation lever 92 is designed to be the greatest. Thus, this design compensates for the lightness of the operation lever 92 against the deformation of the farthest clamp 18. As described above, the operation lever 92 can be operated with the same feel of operation even though the fastening point is changed within the range of the pair of spaced protrusions 47 and 47.

The first reinforcement rib 61 serves to expand the end of the second reinforcement rib 62 in the +X direction. In other words, even though the end of the second reinforcement rib 62 in the +X direction does not move in the −Y direction (see arrow E1 in FIG. 7) together with the spaced protrusion 47, the first reinforcement rib 61 moves in the −Y direction instead, so that a tensile load acts on the second reinforcement rib 62.

Moreover, a rigidity of the second-side spaced clamp 17b (see FIG. 7) is smaller than a rigidity of the first-side spaced clamp 17a (see FIG. 7) since the separation amount in the second expansion slit 13 is different (see FIG. 8). In other words, in a case in which the pair of spaced protrusions 47 and 47 is fastened, the movement amount of the second-side spaced protrusion 47b continuous with the second-side spaced clamp 17b is greater than that of the first-side spaced protrusion 47a continuous with the first-side spaced clamp 17a. Stress may thus be concentrated on the second-side spaced clamp 17b. However, the second-side spaced protrusion 47b is provided with the reinforcement rib 60, which prevents the second-side spaced protrusion 47b from moving significantly. In other words, the movement amount of the first-side spaced protrusion 47a is equal to the movement amount of the second-side spaced protrusion 47b.

Therefore, the stress is restrained so that the stress is not concentrated on the second-side spaced clamp 17b.

As described above, the steering device 100 of the embodiment includes the steering shaft 102, the cylindrical outer steering column 1, the bracket (second bracket 80), and the fastening mechanism 90. The steering shaft 102 is a telescopic steering shaft that extends in the first direction. The steering column 1 rotatably supports the steering shaft 102. The bracket (second bracket 80) includes the first side plate 83 and the second side plate 84 that sandwich the steering column 1 from the second direction orthogonal to the first direction. The fastening mechanism 90 has the operation lever 92 and the fastening shaft 91 penetrating the first side plate 83 and the second side plate 84 and fastens the first side plate 83 and the second side plate 84. The steering column 1 includes the lower column 3 and the upper column 2 that are relatively slidably coupled to each other in the first direction. The upper column 2 includes the clamp 10, the cylindrical part 20, the pair of protrusions 40 and 40, and the reinforcement rib 60. The clamp 10 has the slit 11 extending in the first direction and is externally slidably fitted to the lower column 3. The cylindrical part 20 extends from the clamp 10 and supports the steering shaft 102. The pair of protrusions 40 and 40 between which the slit 11 is interposed protrudes radially outward from the clamp 10, and is fastened by the first side plate 83 and the second side plate 84 when fastened with the fastening mechanism 90. The reinforcement rib 60 extends across the outer peripheral surface of the clamp 10 and the outer surface of the protrusion 40. The clamp 10 is composed of the continuous clamp 16 that is positioned near the cylindrical part 20 and that is less deformable, and the spaced clamp 17 that is spaced apart from the cylindrical part 20 and that is easily deformable. Each of the protrusions 40 includes the continuous protrusion 46 protruding from the continuous clamp 16 and the spaced protrusion 47 protruding from the spaced clamp 17. The reinforcement rib 60 extends from the spaced protrusion 47 toward the continuous clamp 16.

According to the configuration as described above, in the case in which the pair of spaced protrusions 47 and 47 is fastened, the reinforcement rib 60 is drawn toward the spaced protrusion 47. In addition, the continuous clamp 16 is also drawn toward the spaced protrusion 47. Therefore, the force for deforming the reinforcement rib 60 and the continuous clamp 16 is required, so that the feel of operation of the operation lever is heavy. As described above, even though the position fastened by the fastening mechanism 90 is changed, a difference in the feel of operation of the operation lever 92 is small, which less causes discomfort to the operator.

In the steering device 100 of the embodiment, the upper column 2 includes the pair of first contact ribs 51 and 51 that protrudes from the outer peripheral surface of the clamp 10 and that is brought into contact with the first side plate 83 and the second side plate 84 when fastened with the fastening mechanism 90. The reinforcement rib 60 is continuous with the first contact rib 51.

According to the above-mentioned steering device, in the case in which the pair of spaced protrusions 47 and 47 is fastened, the one first contact rib 51 is also drawn toward the spaced protrusions 47. Thus, the load applied to the operation lever 92 increases, and the feel of operation of the operation lever 92 can be further heavier.

In the steering device 100 of the embodiment, the upper column 2 includes the attachment part (extending part) 30 that extends from the spaced clamp 17 toward the opposite side to the cylindrical part 20. The second expansion slit 13 is provided at the boundary between the spaced clamp 17 and the attachment part (extending part) 30, the second expansion slit 13 being continuous with the slit 11 of the clamp 10 and extending in the peripheral direction to separate the spaced clamp 17 from the attachment part (extending part) 30. The spaced clamp 17 is composed of the first-side spaced clamp 17a facing the first side plate 83 and the second-side spaced clamp 17b facing the second side plate 84. The separation amount between the second-side spaced clamp 17b and the attachment part (extending part) 30 in the second expansion slit 13 is greater than that between the first-side spaced clamp 17a and the attachment part (extending part) 30. The reinforcement rib 60 is disposed on the spaced protrusion 47 of the pair of spaced protrusions 47 and 47, which protrudes from the second-side spaced clamp 17b. The first side plate 83 has a higher rigidity in the Y direction than the second side plate 84.

According to the steering device described above, in the case in which the pair of spaced protrusions 47 and 47 is fastened, the movement amounts of the spaced protrusion 47 protruding from the first-side spaced clamp 17a and the spaced protrusion 47 protruding from the second-side spaced clamp 17b can be equalized. Therefore, it is possible to avoid the stress that is concentrated on the second-side spaced clamp 17b to cause damage.

As described above, the embodiment has been described, but the present invention is not limited thereto. For example, the reinforcement rib 60 may not include the first reinforcement rib 61, but may include only the second reinforcement rib 62.

REFERENCE SIGNS LIST

100 Steering device
101 Steering wheel
102 Steering shaft
108 Upper shaft
109 Lower shaft
110 Gearbox
1 Steering column
2 Upper column
3 Lower column
10 Clamp
11 Slit
12 First expansion slit
13 Second expansion slit (expansion slit)
16 Continuous clamp
17 Spaced clamp
17a First-side spaced clamp
17b Second-side spaced clamp
20 Cylindrical part
21 Bearing
23 Second annular rib
30 Attachment part (extending part)
40 (41, 42) Protrusion (first protrusion, second protrusion)
43, 44 Long groove
46 Continuous protrusion
47 Spaced protrusion
50 Contact rib
51 First contact rib
52 Second contact rib
60 Reinforcement rib
61 First reinforcement rib
62 Second reinforcement rib (reinforcement rib)
70 First bracket
74 Pivot shaft
80 Second bracket (bracket)
83 First side plate
84 Second side plate
90 Fastening mechanism
91 Fastening shaft
92 Operation lever
93 Fixed Cam
94 Rotating Cam
95 Nut

The invention claimed is:

1. A steering device comprising:
a telescopic steering shaft that extends in a first direction;
a steering column of a cylindrical outer shape configured to rotatably support the steering shaft;
a bracket including a first side plate and a second side plate that sandwich the steering column from a second direction orthogonal to the first direction; and
a fastening mechanism that has an operation lever and a fastening shaft penetrating the first side plate and the second side plate and configured to fasten the first side plate and the second side plate,
wherein
the steering column includes a lower column and an upper column that are relatively slidably coupled to each other in the first direction,
the upper column includes:
a clamp that has a slit extending in the first direction and that is configured to be externally slidably fitted to the lower column;
a cylindrical part that extends from the clamp and configured to support the steering shaft;
a pair of protrusions between which the slit is interposed, the protrusions protruding radially outward from the clamp and being fastened by the first side plate and the second side plate when fastened with the fastening mechanism and the protrusions having long grooves into which the fastening shaft is inserted and each of which extends in the first direction; and
a reinforcement rib that extends across an outer peripheral surface of the clamp and an outer surface of one of the protrusions,
the clamp includes:
a continuous clamp that is positioned near the cylindrical part and that is continuous with the cylindrical part; and
a spaced clamp that is spaced apart from the cylindrical part,
each of the protrusions includes:
a continuous protrusion that protrudes from the continuous clamp; and
a spaced protrusion that protrudes from the spaced clamp, and
a third direction is a direction perpendicular to both of the first direction and the second direction,
the reinforcement rib is disposed above the long grooves in the third direction,
the reinforcement rib is further disposed in the first direction between a first end and a second end of the long grooves in the first direction, and
the reinforcement rib is inclined in the third direction such that a part of the reinforcement rib is closer to the cylindrical part as the part of the reinforcement rib extends in the third direction, and linearly extends from one of the spaced protrusions toward the continuous clamp.

2. The steering device according to claim 1, wherein
the upper column includes a pair of first contact ribs each of which protrudes from the outer peripheral surface of the clamp, one of the first contact ribs being configured to be brought into contact with the first side plate and another of the first contact ribs being configured to be brought into contact with the second side plate when fastened with the fastening mechanism, and
the reinforcement rib is continuous with one of the first contact ribs.

3. The steering device according to claim 1, wherein
the upper column includes an extending part that extends from the spaced clamp toward an opposite side to the cylindrical part,
an expansion slit is provided at a boundary between the spaced clamp and the extending part, the expansion slit being continuous with the slit of the clamp and extending in a peripheral direction to separate the spaced clamp from the extending part,
the spaced clamp includes:
  a first-side spaced clamp that faces the first side plate; and
  a second-side spaced clamp that faces the second side plate, and
a separation amount in the expansion slit between the second-side spaced clamp and the extending part is greater than that between the first-side spaced clamp and the extending part, and
the reinforcement rib is disposed on the spaced protrusion which protrudes from the second-side spaced clamp.

* * * * *